April 25, 1967

E. BAUER 3,315,450

CROP GATHERING AND CHOPPING MACHINE

Filed Nov. 9, 1964

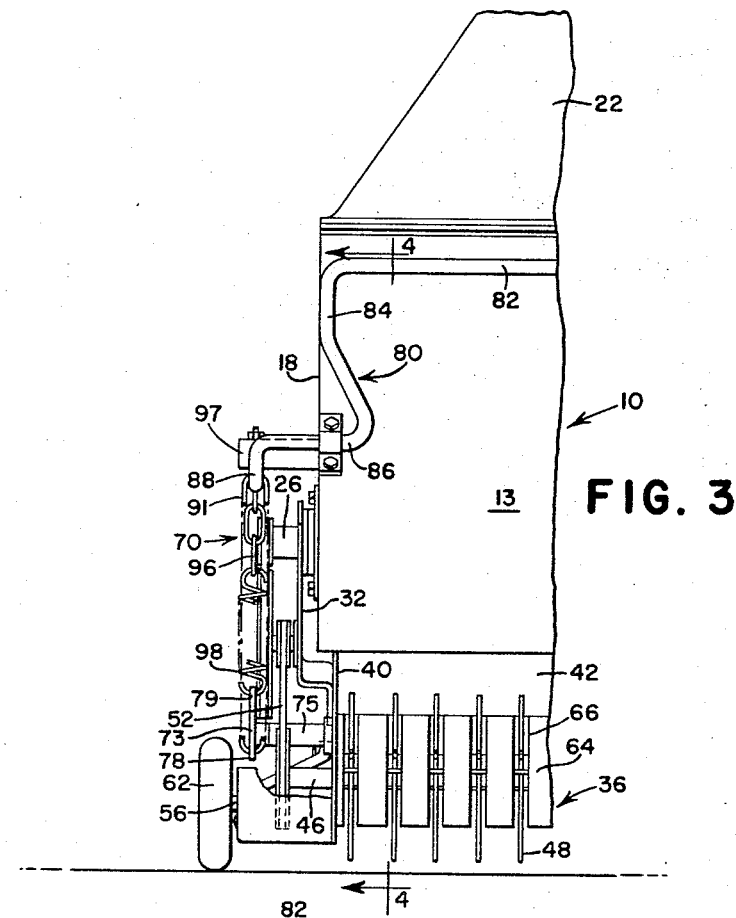

United States Patent Office 3,315,450
Patented Apr. 25, 1967

3,315,450
CROP GATHERING AND CHOPPING
MACHINE
Edgar Bauer, Osterburken, Germany, assignor to Deere
& Company, Moline, Ill., a corporation of Delaware
Filed Nov. 9, 1964, Ser. No. 409,917
Claims priority, application Germany, Nov. 8, 1963,
D 42,890
3 Claims. (Cl. 56—24)

This invention relates to crop handling machines and more particularly to a forage harvester and a removable pickup device therefor.

The machine will be described as having a flail type chopping device; although, other types of rotary choppers could readily be used. A typical flail type forage harvester operates over a field to sever and shred the crop and to deliver the chopped material to a trailing vehicle such as a wagon. Such machine will also pick up crops previously severed and lying on the ground, but when used in this fashion a certain amount of material is lost through the open bottom of the chopper housing.

The primary object of the present invention is to provide, for a forage harvester, a pickup device for gathering severed crops and feeding them to a rotary type chopper. Another object is to provide such a machine with means including a bottom plate for closing the bottom of the chopper housing so as to eliminate crop losses. Another object is to provide such a pickup device which is easily removable for operation of the machine as a conventional flail type chopper. The present invention features a pickup which delivers the material directly to the rotor.

Another feature of the invention resides in a reducing clearance between the bottom plate means and the chopper rotor in the direction of rotation, the clearance being at a minimum at the point where the pickup delivers the material to the chopper so as to produce a blast of air which facilitates the stripping of the material from the pickup for delivery to the rotor. This reduced clearance and the air flow created thereby also prevent the accumulation of material between the bottom plate and the rotor. Clogging is further prevented by the pickup positively moving the material into the path of the chopper.

Other objects are to provide a vertically swingable pickup device to accommodate changes in the contour of the ground and to protect the pickup when it strikes a foreign object; to provide a pickup which can be locked in a raised position during transport of the machine; to provide counterbalacing means for the pickup to aid the raising of the pickup for transport or when the pickup strikes a foreign object; and to provide such a machine wherein the height of the pickup relative to the ground is adjustable.

These and other objects and advantages of the invention will become apparent from the following detailed description and accompanying drawings wherein:

FIG. 3 is a front elevation view of one end of the machine in operating position with portions of the machine removed.

FIG. 4 is a sectional view taken along the line 4—4 of FIG. 3 with the paths of the chopper rotor and the pickup rotor illustrated in broken lines.

Figure 1:
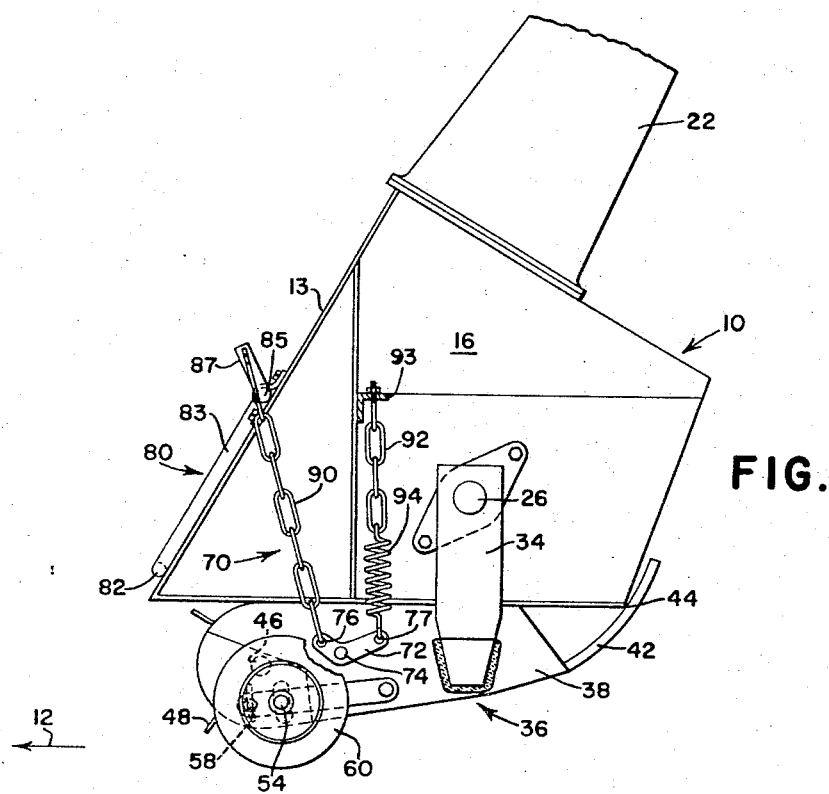
FIG. 1 is a side elevation view of the machine with the pickup in transport position, and with portions of the frame structure and drive mechanism omitted.

The machine chosen for purpose of illustration includes a housing 10 supported on a main frame (not shown) conventionally mounted on a tractor or on separate wheels (also not shown) for advance over the ground in the direction of the arrow 12. The housing 10 includes a forward wall 13 and a chopper housing 14 of generally inverted U shape (FIG. 4) which is open toward the bottom to form a bottom or inlet opening 15 that extend between opposite vertical side walls 16 and 18. It is to be understood that such words as "top," "bottom," "upper," "lower," "forward," "rear," etc. are mere words of convenience used to more clearly describe the invention and are not to be construed as limiting terms.

The housing 14 has a tangentially upwardly disposed outlet opening 20 extending the length of the housing and communicating with an upwardly extending discharge spout 22. A horizontal chopper rotor 24, here shown as a flail type rotor, is coaxially mounted within the housing 14 and includes a rotor shaft 26 having opposite ends journaled in side walls 16 and 18 and a plurality of radial flails 28 swingably mounted on the shaft.

The rotor 24 is rotated in the direction of the arrow 30 through conventional drive means (not shown) preferably powered by the tractor power take-off mechanism. A knife blade or shear bar 29 extends inwardly from the lower front edge of the housing 14 adjacent to the periphery of the rotor 24 to improve the chopping action.

A pair of parallel support members 32 and 34 pivotally depend from opposite ends of the shaft 26 and are swingable in vertical arcs transverse to the rotor axis. A pickup indicated generally by the numeral 36, is mounted between the lower ends of the support members and is thus swingable in a limited arc about the rotor axis; although, the pickup pivot need not necessarily coincide with the rotor axis, since the support members could be mounted at other locations on the side walls 16 and 18.

The pickup includes a pair of opposite vertical side walls 38 and 40 respectively attached to the opposite support members 34 and 32 and also includes an arcuate bottom plate 42 extending between the side walls 38 and 40, the bottom plate being concave toward the rotor 24 and the concave side of said bottom plate seating against the lower rear edge 44 of the rotor housing 14 in any position of the pickup device. The side walls 38 and 40 lie adjacent to the side walls 16 and 18 respectively, enclosing the side portions of the bottom opening 15.

The rear portion of the bottom plate 42 has a constant radius relative to the shaft 26. However, the forward portion of the bottom plate has a decreasing radius in the direction of rotation (arrow 30) whereby the distance between the rotor 24 and the bottom plate decreases toward the front of the bottom plate.

A horizontal shaft 46 is journaled at opposite ends in the forward portions of the side walls 38 and 40 respectively and carries a plurality of radial tines 48, forming a pickup rotor 49. The rotor 49 is rotated in the direction of the arrow 50 by drive means 52, here shown as a belt and pulley drive connecting the shaft 46 to the shaft 26 for driving the shaft 46 at a reduced speed relative to the rotor 24.

Figure 2:
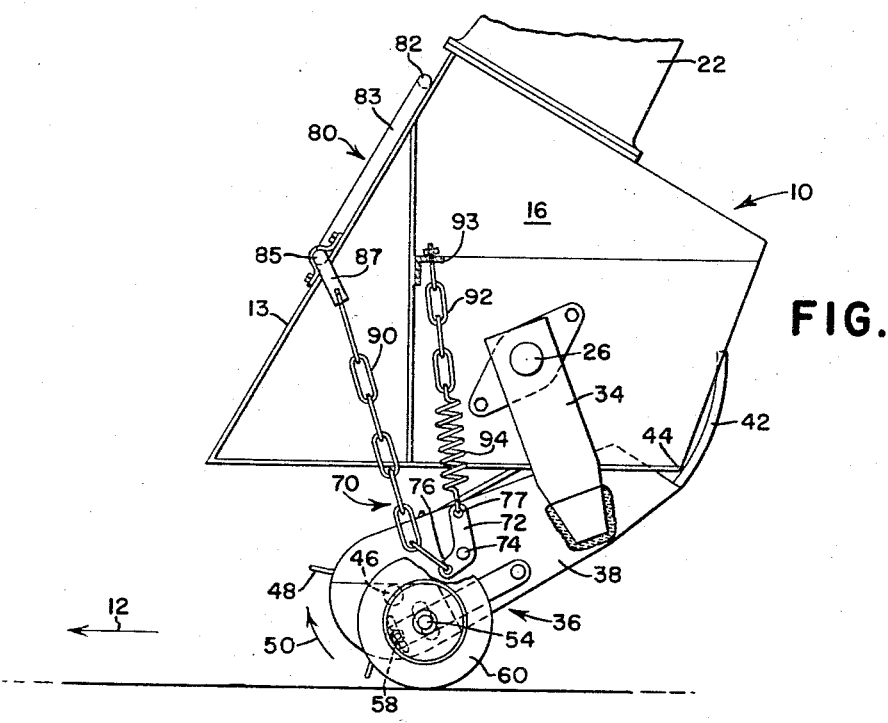
FIG. 2 is a view similar to FIG. 1 but with the pickup in operating position.

A pair of coaxial wheel spindles 54 and 56 are vertically adjustably carried by the side walls 38 and 40 respectively, parallel to the shaft 46 and the side walls have locking means 58 for holding the spindles in selected positions. Supporting wheels 60 and 62 are mounted on the spindles 54 and 56 respectively and normally engage the ground as shown in FIGS. 2, 3 and 4 to support the pickup rotor 49 a short distance above the ground, the distance being adjustable to accommodate variations in crop and ground conditions.

An oval shaped stripper 64 encloses the shaft 46 and includes a plurality of radial slots 66 through which the tines 48 protrude in a forwardly direction, the rear portion of the stripper having a greater radius whereby the tines are withdrawn within the slots to strip the material from the tines. The stripper is mounted on and extends forwardly from the bottom plate 42, the top surface of the stripper forming a continuation of the bottom plate.

The arcuate movement of the pickup 36 about the shaft 26 is limited by a suspension means 70 which includes a pair of bell cranks 72 and 73 respectively mounted on the side walls 38 and 40 for rocking movement about the pivots 74 and 75. The bell crank 72 includes arms 76 and 77 and the bell crank 73 includes arms 78 and 79.

A generally U-shaped bail or stirrup 80 having a horizontal bight portion 82 between leg portions 83 and 84 is pivotally mounted to the forward wall 13 about horizontal pivot members 85 and 86 carried at the end of the leg portions 83 and 84 respectively. Lever arms 87 and 88 are transversely affixed to the pivot members 85 and 86 respectively, forming an obtuse angle with the respective leg portions 83 and 84.

A chain 90 extends between the end of the lever arm 87 and the arm 76 of the bell crank 72 and a similar chain 91 extends between the end of the lever arm 88 and the arm 78 of the bell crank 73. Another chain 92 has one end adjustably connected to a bracket 93 mounted on the side wall 16 and the other end connected to one end of a helical tension spring 94, the other end of the spring being connected to the arm 77 of the bell crank 72. Similarly, a chain 96 has one end adjustably connected to a bracket 97 on side wall 18 and the other end connected to the end of a helical tension spring 98, the other end of the spring being connected to the arm 79 of the bell crank 73.

To raise the pickup 36 into a transport position as shown in FIG. 1, the stirrup 80 is swung downwardly about the pivots 85 and 86 until the horizontal bight portion 82 seats against the lower part of the front wall 13. This movement rotates the lever arms 87 and 88 to an upward position, consequently raising the chains 90 and 91, which in turn rotate the bell cranks 72 and 73 against the bias of the springs 94 and 98 and also raise the entire pickup 36 around the shaft 26. As is apparent from FIG. 1, the pickup is automatically locked in this position since the line of force exerted by the chains 90 and 91 on the lever arms 87 and 88 passes on the forward side of the pivots 85 and 86, tending to rotate the stirrup 80 into tighter engagement with the front wall 13.

To lower the pickup into operating position, as shown in FIGS. 2, 3 and 4, the stirrup 80 is swung upwardly until the horizontal portion 82 seats against the upper portion of the front wall 13, whereby the lever arms 87 and 88 swing rearwardly and downwardly toward the bell cranks 72 and 73 to lower the chains 90 and 91, which are sufficiently long to permit the wheels 60 and 62 to engage the ground with enough slack in the chains to allow additional downward movement of the pickup to accommodate depressions in the ground. Since the chains 90 and 91 are slack, the chains 92 and 96 and their associated springs 94 and 98 rotate the bell cranks 72 and 73 until their respective arms 77 and 79 extend in the direction of the chains, at which time the springs 94 and 98 exert a counterbalancing upward force on the pickup whereby a small amount of additional upward force, such as supplied by the pickup striking a foreign object, will raise the pickup, thereby protecting it against damage.

In operation, as best seen in FIG. 4, the machine advances over a field of severed crops in the direction of the arrow 12. The rotating pickup tines 48 pick up the crop material and move it upwardly and rearwardly. The reducing clearance between the path of the flails 28 and the bottom plate 42 produces a tangential blast of air at the forward edge of the bottom plate 42, the air blast aiding the centrifugal movement of the material from the tines, the stripping action being completed by the stripper 66. Since the stripping action is aided by the air current and since the stripper removes any remaining material closely adjacent to the rotor path, the pickup will not become clogged even in heavy or wet material. The tangential blast of air at the front edge of the bottom plate 42 also prevents the buildup of material between the rotor 24 and the bottom plate.

The upwardly and rearwardly moving material is thrown through the bottom opening 15 into the path of the rotor 24 where it is chopped and tangentially propelled through the outlet opening 20 and the discharge spout 22. The knife 29, which extends adjacent to the path of the flails, aids in the chopping action. The bottom plate 42 prevents any material which clings to the rotor and is not initially discharged from falling through the bottom of the machine, the material being carried by the air flow from the bottom plate into the rotor path for subsequent discharge.

Since the rear portion of the bottom plate has a constant radius relative to the shaft 26, the bottom plate seats or seals tightly against the rear of the bottom edge 44 regardless of the position of the pickup. The top edges of the side walls 38 and 40 are closely adjacent to the bottom edges of the side walls 16 and 18 respectively and prevent the lateral escape of air and material laterally from the bottom plate 42.

The pickup is easily removed for operation of the machine as a conventional flail type harvester by disconnecting the drive means 52 and the suspension means 70 and removing the support members 32 and 34.

Other features and advantages of the present invention will readily occur to those skilled in the art, as will many modifications and alterations in the preferred embodiment of the invention described herein, all of which may be achieved without departing from the spirit and the scope of the invention.

What is claimed is:

1. In a crop chopping machine adapted to advance over a field of previously cut crops and having a chopper housing of generally inverted U shape including opposite side walls, front and rear wall portions and an open bottom and a chopper rotor rotatable in the housing on an axis transverse to the line of advance with the forward portion of the rotor moving upwardly and operative to engage crops via the open bottom, the improvement comprising: a crop pickup means closely forwardly of and below the chopper rotor and operative to move previously severed crops upwardly through the open bottom and directly to the chopper rotor; means mounting the pickup means for travel with the machine; and arcuate, plate-like bottom means disposed beneath and concave toward the chopper rotor, transversely spanning the housing bottom and extending rearwardly from the pickup means to a crop-tight junction with the housing rear wall, the clearance between the rotor and the bottom means decreasing in the direction of rotation of the rotor.

2. The invention defined in claim 1 in which the mounting means mounts the pickup means and the bottom means for movement in unison about the rotor axis, and including adjusting means for positioning the pickup means.

3. The invention defined in claim 2 wherein the mounting means also includes a spring means operatively connected to the housing and the pickup means and partly counterbalancing the weight of the pickup means.

References Cited by the Examiner

UNITED STATES PATENTS 3,233,394   4/1966   Lundell _____ 56—24 X
3,252,277   5/1966   Weichel _____ 56—345

FOREIGN PATENTS 225,472   1/1963   Austria.

OTHER REFERENCES

German printed application 1,157,833, November 1963.
German printed application 1,163,072, February 1964.

ABRAHAM G. STONE, *Primary Examiner.*

ANTONIO F. GUIDA, *Examiner.*